May 1, 1923.

1,454,000

C. W. SAXE

CERAMIC WARE AND METHOD OF MAKING THE SAME

Filed Dec. 2, 1920

WITNESSES

INVENTOR
Charles W. Saxe.
BY
ATTORNEY

Patented May 1, 1923.

1,454,000

UNITED STATES PATENT OFFICE.

CHARLES W. SAXE, OF WORCESTER, MASSACHUSETTS, ASSIGNOR TO NORTON COMPANY, OF WORCESTER, MASSACHUSETTS, A CORPORATION OF MASSACHUSETTS.

CERAMIC WARE AND METHOD OF MAKING THE SAME.

Application filed December 2, 1920. Serial No. 427,684.

*To all whom it may concern:*

Be it known that I, CHARLES W. SAXE, a citizen of the United States of America, residing at Worcester, in the county of Worcester and State of Massachusetts, have invented certain new and useful Improvements in Ceramic Ware and Methods of Making the Same, of which the following is a full, clear, and exact specification.

This invention relates to ceramic ware and a method of manufacturing the same, and more particularly ware provided with porous and impervious sections intimately and integrally united.

In the manufacture of porous ware it has been common practice to simply apply a glaze to that portion which was to be rendered non-porous, as described in the patent to Boeck No. 1,081,573 of Dec. 16, 1913, While the glaze would penetrate the porous structure to some extent, and when applied to both sides of an object would perhaps penetrate the greater part of the wall thickness, there would nevertheless be an inner portion or layer which was still porous and into which liquids would be absorbed from the portions of the wall which were not glazed. It has been proposed to overcome this difficulty by introducing a glaze septum between the glazed and unglazed portions, as described in the patent to Jeppson No. 1,081,535 dated Dec. 16, 1913, but according to the method there set forth the crucible which is obtained has several inherent disadvantages both in manufacture and construction. It is difficult to obtain a satisfactory joint between the sections, the coefficients of linear expansion are opposed, and the wall thickness is increased in the glazed section, making it awkward to use in quantitative analytical work.

It is therefore an object of my invention to avoid these difficulties of manufacture and to produce a porous article which is much more resistant to the conditions of use and more convenient in its manipulation. Further objects will be apparent in the following disclosure.

In order to illustrate one embodiment of my invention, reference is to be had to the accompanying drawings in which.

Figure 1:
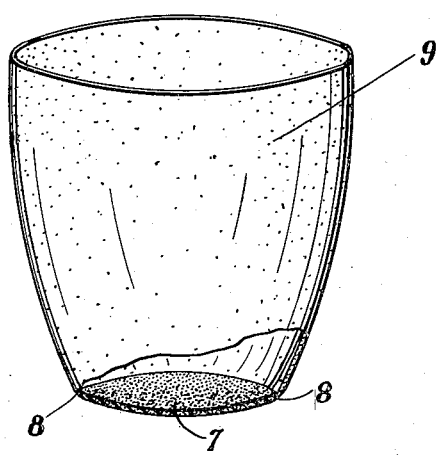
Figure 1 shows a crucible shape made in accordance with my method, having the side wall broken away to show the bottom.

In accordance with my invention, I provide porous ceramic ware, such as filter crucibles, cones, discs, dishes, tubes, extraction thimbles and similar articles for filtration purposes, which have a porous portion integrally united by vitrification with another portion having a dense, non-porous structure. In such ware, the porous portion may be formed of refractory or inert granules, such as silicon carbide or crystalline alumina, suitably bonded together, and the impervious portion may be made of a non-porous composition such as porcelain. As a specific embodiment of my invention, I may make the porous portion of crystalline alumina granules, bonded with a vitreous ceramic material, and the impervious portion of a chemically resistant porcelain composition, the two ceramic compositions being such that when fired to vitrify the porcelain, the crystalline alumina will also be bonded to form a porous magma uniting the crystalline alumina grains.

The following compositions have been found suitable for making a filter crucible in accordance with my invention, but it will be obvious to those skilled in the ceramic art that this invention is not limited to the proportions or ingredients specified:

*Porous portion.*

Crystalline alumina (200 mesh and finer), 85% by weight.
Ball clay, 15% by weight.
Sufficient water to form a fluid slip.

*Impervious portion (porcelain composition).*

Flint, 37½% by weight.
Feldspar, 32½% by weight.
Ball clay, 30% by weight.
Sufficient water to form a fluid slip.

One method which may be employed to carry out my invention involves shaping the two portions separately in an absorbent mold, the first part being cast in the usual manner after covering those portions of the mold corresponding to the second part of the article to be made, and then forming the second part of the article from its composition, while both are in the plastic condition, care being taken that they are intimately joined each to the other. As shown in the drawings, the apparatus employed may comprise a mold 1, made of plaster of Paris or similar absorbent material, which has a depression 2 of the approximate size and shape of the article to be molded. Into this is placed a plug 3, which is solid or hollow as the case may be, to cover the bottom of the crucible 4 or such portion of the article as it is desired not to cast at first. A fluid mixture 5 of the composition to be used for the upper porcelain portion of the crucible, such as ball clay, pulverized flint, feldspar and water, is now poured into the space between the plug 3 and the mold 1, until it is full. It is then allowed to stand for a few minutes, the time being determined by actual experiment and by the thickness of wall required. The moisture is withdrawn from the mixture next to the mold, thus forming a layer of comparatively dry material against the inner walls of the mold.

Figure 4:
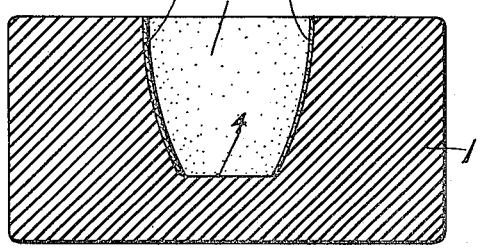
Fig. 4 is a vertical cross section of a mold as in Fig. 3, the core and excess of mixture having been removed, leaving the side walls of the crucible.
Figure 5:
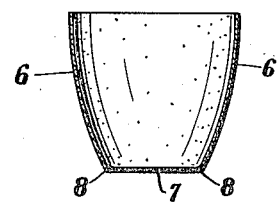
Fig. 5 is a vertical section of the crucible showing the junction between the porous and the impervious parts.

The mixture is now emptied from the mold, the plug being held in place until the larger part has run out, and the plug then withdrawn. This will leave a thin coating of the green mixture 6 covering the inner walls of the mold except at the bottom 4 as shown in Fig. 4.

A small amount of a fluid mixture 7 which, when fired, will yield a porous structure, such as crystalline alumina, clay and water, is immediately spread over the bottom of the mold 4 to the thickness desired, care being taken that it wet the side walls already formed and make a close and smooth union with it at all points of contact.

The crucible thus formed is allowed to dry slowly and thoroughly, and then fired according to usual practice, at such temperature as to vitrify the ceramic materials in both portions. An article, thus molded of the compositions referred to, fired to cone 12 or 13 on the Seger scale of heat measurement, held at this temperature for 48 to 72 hours and cooled slowly, will give the impervious structure desired in the non-porous section and vitrify the bond in the porous section and yet not destroy its porous structure between the alumina grains. While the bonding material of the lower portion may become fluid during the firing operation, wetting the alumina particles and mingling with them by capillarity, it is not present in sufficient quantity to fill the voids between them. With other compositions and other materials, different firing conditions will of course be necessary, depending upon their softening temperatures, and the changes which they undergo upon heating.

Figure 2:
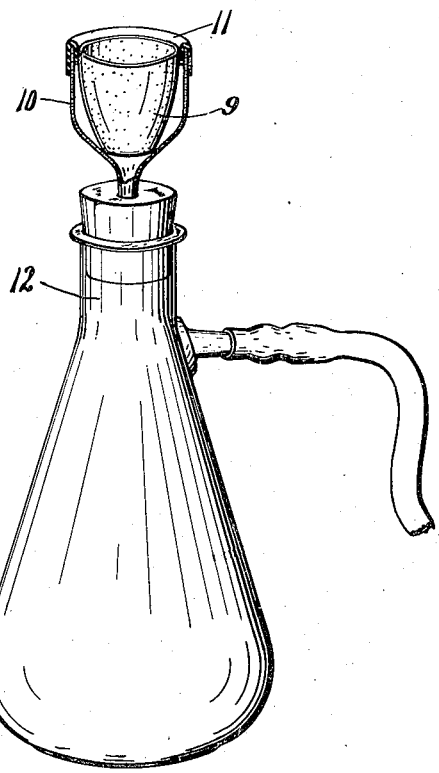
Fig. 2 illustrates this crucible as used for filtration with suction.
Figure 3:
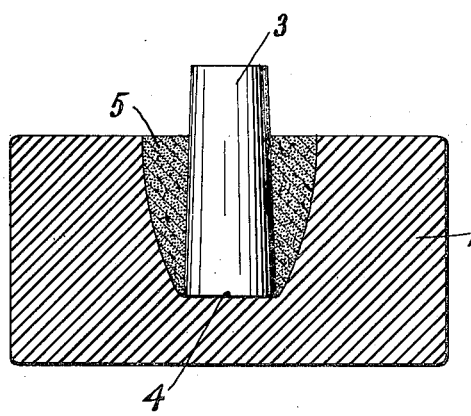
Fig. 3 is a vertical cross section of a mold with the core or plug in place, and filled with casting mixture.

A crucible made in this fashion is suitable for ordinary filtration purposes, but may be used to particular advantage in conjunction with a suction apparatus as illustrated in Fig. 2. The crucible 9 is set into a glass funnel 10, with a rubber gasket 11 making an air tight joint between the two at the top and the stem of the funnel is connected to the suction apparatus 12, substantially as shown. When the suction is started in the apparatus, the liquid to be filtered is poured into the crucible, the solute being drawn through the porous bottom leaving the solid matter collected in the bottom of the crucible where it may be readily washed free of solute, dried, ignited and weighted, as for example in quantitative analytical work.

This type of filtering ware possesses several marked advantages over other materials which have been available for filtration purposes. The impervious portions are made of a single mixture which, when fired, will be non-porous throughout so that slight cracks or chipping will not expose a porous structure. They are moreover of the same thickness as the porous sections, to which they are joined while both are in the plastic condition, which results in a much more uniform product in appearance and in structure. The difference of coefficient of expansion between the two materials is diminished almost to zero by proper selection and combination of the ingredients used, and will accordingly be free from the strains which such differences set up when the article is subsequently heated or cooled. A more complete separation of the solids from the liquids in which they are contained is also possible with filters made in accordance with my invention.

While I have described the preferred method of carrying out my invention, it is to be understood that various modifications of it are possible and that different materials may be used according to the shape desired, the conditions which it is to withstand and the purpose which it is intended to serve. Such modifications or changes are considered as within the scope of my invention and are comprehended in the following claims:

I claim:

1. A ceramic article consisting of an impervious portion of porcelain integrally united by vitrification with a porous portion of crystalline alumina granules bonded by vitreous clay material.

2. The method of manufacturing a ceramic article comprising the steps of shaping a portion of the article from a ceramic material which will become impervious when fired and shaping the remainder of the article from another ceramic mixture which will have a porous structure when fired under the same conditions, joining the two sections thus formed while in the plastic condition, drying the article and firing it to vitrify the ceramic ingredients and to integrally unite the two portions.

3. The method of manufacturing a ceramic article comprising the steps of shaping one portion from a porcelain mixture, forming the remainder of the article from a mixture of refractory granules, a ceramic bonding material and water, which will have a porous structure when fired, uniting the two portions thus shaped while in the plastic or green condition, drying the article and firing it to vitrify the porcelain, to bond said granules together and integrally unite the two portions of the article.

4. The method of making a ceramic article by means of a mold comprising the steps of covering a portion of the mold, pouring a porcelaneous mixture into said mold and permitting a layer to harden against the walls of the mold, removing the excess plastic material, uncovering the remaining portion of the mold, shaping the remainder of the article from a ceramic mixture, which will be porous when fired, in contact with the previously formed layer, joining the two sections thus formed while in the plastic condition, drying the article thus shaped and firing it to vitrify the ceramic materials and integrally unite the two portions of the article.

5. The method of making a filter crucible comprising the steps of covering the side wall of a mold of the desired shape with a layer of green porcelaneous material, placing in the bottom of the mold a layer of refractory granules and a ceramic bond which is capable of becoming vitreous and forming a porous mass when the body is fired to produce the porcelain side wall and thereafter firing the crucible to vitrify the bond and porcelaneous material and integrally unite the two parts of the crucible thereby.

Signed at Worcester, Massachusetts, this 1st day of Dec. 1920.

CHARLES W. SAXE.